United States Patent Office 3,127,296
Patented Mar. 31, 1964

3,127,296
PROCESS FOR BONDING A TERPOLYMER
FILM TO A METAL SUBSTRATE
Leonard F. Guziak, Pittsburgh, Pa., assignor to Koppers
Company, Inc., a corporation of Delaware
No Drawing. Filed Dec. 22, 1959, Ser. No. 861,218
4 Claims. (Cl. 156—332)

This invention relates generally to coatings and more particularly to coatings which are heated or baked.

It is common practice to provide durable finishes for metal articles ranging in size from jewelry to automobile bodies by applying a coating to the article by dipping, spraying, or brushing the articles with a liquid coating and then heating the article so as to bake the coating. The handling of liquid coating compositions is messy and the liquids have generally a short pot life.

It has now been found that unexpectedly a terpolymer of styrene, ethylacrylate and glycidal methacrylate can be partially cross-linked with polyglycol diamine to produce a clear self-supporting film when a layer of composition is baked at a temperature of 50–125° C., which film can later be applied to an article and baked at a higher temperature whereupon the film adheres to the article to provide a durable protective film for the article.

The terpolymer for use in this invention is formed by copolymerizing styrene, ethyl acrylate and glycidal methacrylate in an inert solvent in the presence of an initiator such as benzoyl peroxide. An excellent terpolymer for use in the invention is comprised of 60 parts of styrene, 20 parts by weight of ethylacrylate and 20 parts by weight of glycidyl methacrylate. As the proportion of styrene in the terpolymer is increased and the proportion of ethylacrylate and glycidyl methacrylate is decreased, the flexibility of the film decreases and the film becomes more brittle. Also, with lower ethylacrylate and glycidyl methacrylate ratio, the solvent resistance and infusibility decreases. It has been found therefore that advantageously the ingredients used should not be varied individually more than ten percent in either direction from the 60–20–20 ratio. While ethylacrylate is the preferred monomer because of its internal plasticizing action on the terpolymers other homologs of ethyl acrylates may be used, for example methacrylates and ethyl hexyl acrylate. Glycidyl methacrylate, i.e., 2,3-epoxypropyl methacrylate is described in United States Patent No. 2,524,432.

Glycol diamines for use in the invention are commercially available. The Carbide and Carbon Chemical Corporation, for example, sells the diaminopropyl ether of ethylene glycol under the designation H–221 and the diaminopropyl ether of triethylene glycol under the designation H–264.

The coatings prepared from films containing less than ten percent by weight of the diamine do not have sufficient flexibility and impact resistance. Particularly good coatings are provided when the diamine concentration was within the range of ten to twenty percent of the composition.

The composition formed by the mixing of the terpolymer and the polyglycol diamine slowly forms a gel at room temperature. The fact that this gel is resistant to solvents indicates that the gelation is due to cross-linkage. At room temperature, no self-supporting film is formed. Unexpectedly, it has been found that when a thin layer of from one to ten mills of the composition is heated at a slightly elevated temperature, for example from 50–125° C., for from ten to thirty minutes, a resulting self-supporting clear film is formed which film can be removed from the sub-surface. If the layer has been applied to metal sub-surface, the layer, which is now a film, can be removed from the metal by simple flexing of the metals. The film can be folded, creased, and bent without cracking. The film is not effected by boiling water or common organic solvents and has an indefinitely long storage life.

EXAMPLE I

To form the terpolymer, 60 parts by weight of styrene, 20 parts by weight of ethylacrylate, and 20 parts by weight of glycidyl methacrylate were added to 100 parts by weight of methyl ethyl ketone and 3 parts by weight of benzoyl peroxide in an agitated reactor. The polymerization was carried out by heating and agitating the solution while maintained at a temperature of 70° for a period of 20 hours. Thereafter the solution of terpolymer was cooled to room temperature.

To 80 parts of the terpolymer formed above was added 20 parts of diaminopropyl ether of ethylene glycol. This composition was then applied to the surface of aluminum and baked at 100° for ten minutes. A clear cross-linked film was formed and by flexing the metal was easily removed from the surface.

The film was then applied to a metal strip and heated to 150° for one-half hour. The film had firmly adhered to the metal and could not be dislodged by bending or by scraping. After immersion in acetone for 775 hours, the baked coating was not affected.

EXAMPLE II

Two sets of coated strips were prepared from the terpolymer-diamine composition of Example I and were heated overnight at 50° C. Opaque films were obtained that could be removed from the metal. A third set of coated strips were permitted to air-dry at room temperature. Continuous films were not formed, instead opaque chips separated from the metal within two days. Neither the film nor the chips dissolved or swelled after 24 hours in either toluene or acetone. It was concluded that cross-linkage had occurred both at room temperature and at 50° C.

EXAMPLE III

The terpolymer-diamine composition of Example I was applied to cold rolled steel plates with a Fisher-Payne Dipcoater, and a continuous film could be obtained by heating the coating at 50° C. for one-half hour. Such films showed very little elasticity and lacked tear resistance but they could be cross-creased without breaking. Also, the films could be re-applied to metal strips and after 45 minutes baking at 160° C. the baked coating passed a ⅛ inch flex (bending the test panels over a ⅛ inch diameter mandel) and a 56 inch-pound impact test using a Gardner Variable Impact Tester. Adhesion of the film to metal was obtained at the elevated temperature, as evidenced by the fact that the coating could not be removed by scraping with a knife blade. The adhesive strength was determined by placing the film, that had been obtained at 50° C., between strips of tin plate and baking the test piece at 190°–195° C. for thirty minutes; a shear strength value of 250 p.s.i. was obtained.

A time-temperature study was conducted to determine the influence of these variables on the properties of the films. At each set of conditions four samples were prepared. Color, water resistance, adhesion, flexibility and impact resistance were used to characterize the films. The data are listed in Example IV.

EXAMPLE IV

A series of metal plates were coated with the terpolymer-amine composition of Example I. The plates with the films were baked at various temperatures to illustrate the effect of the time of baking at various temperatures. At 50° C., time of baking had very little effect on the films, the films were opaque, and did not adhere to the metal. At 100° C., a 20 minute bake produced clear films, and after sixty minutes these clear films acquired adhesion (although they could still be removed by soaking in water), flexibility, and impact resistance. Similar films were obtained after a 50 minute bake at 125° C., and after a 20 minute bake at 150° C.

Water resistance, that is the film could not be removed from the metal by soaking in water, was finally obtained after 30 minutes at 150° C., 10 minutes at 175° C., or 4 minutes at 200° C. Under these conditions the character of the deposit on the metal changed from that of a film which could be stripped to that of a protective coating for metals. After a ten minute bake period at 200° C., these films could not be scratched by an 8H pencil.

Thus it is evident that the terpolymer-diamine blend displayed properties of both a cross-linked, self-supporting film and a surface coating for metals. The selection of time-temperature conditions determined the type. Cross-linkage in the film was obtained first, adhesion of the film to metal occurred upon additional baking and with prolonged baking, both adhesion and film hardness were improved.

EXAMPLE V

Metal strips coated with the terpolymer-diamine composition of Example I were baked for one hour at 100° C. and the clear transparent films were removed either by flexing the strip or by soaking in water. An immersion of the film in toluene for four weeks and an immersion for five hours in boiling water did no damage to the film. Film formed as above was placed between two sheets of metal wherein a hole exposed a section of the film of 3/8 inch diameter. A ring and ball was placed over the exposed film so that a ball weighing 3.6 grams rested on the center of the film, the arrangement was placed into an oven at 150° C. and heated for 20 minutes; the ball had no effect on the film at this temperature.

EXAMPLE VI

Terpolymers made according to Example I except that the glycidyl methacrylate content was decreased from 20 to 15 and 10 parts and with a subsequent increase in either the styrene or ethyl acrylate content, were mixed with 20 percent of the polyglycol diamine H-221 (Carbide and Carbon Corporation). Tin plate strips were dip coated with these blends and coatings of one mil thickness were obtained after a bake at 160° C. for 45 minutes. The coated strips with film thicknesses of 0.9 to 1.0 mil were evaluated for flexibility and impact resistance. The data are shown below.

| Monomer Ratio—Styrene, Ethyl Acrylate, Glycidyl Methacrylate (parts) | Flexibility (1/8 inch bead) | Impact Resistance, 112 inch-pounds |
| --- | --- | --- |
| 60-20-20 | good | good. |
| 60-25-15 | very slight craze | Do. |
| 60-30-10 | slight craze | opaque film. |
| 65-20-15 | very slight craze | Do. |
| 70-20-10 | slight craze | Do. |
| 65-25-10 | do | Do. |

The foregoing has presented a novel composition particularly usuable to form films which may be used for the protective coatings of metals. As will now be understood by those skilled in the art, various fillers and pigments such as wood flour, antimony oxide, titanium dioxide, sand, clay, mica dust, diatomaceous earth, etc. may be used as a constituent of the composition to produce coatings of various colors.

A typical red iron oxide primer composition may include 248 parts of the terpolymer made in accordance with Example I, 25 parts of the glycol diamine of Example I, 136 parts of red iron oxide (Mapico 4485) 104 parts Mistron HG-75 (Sierra Talc) and 265 parts Cellosolve acetate.

A typical white top-coat enamel composition may be comprised of 248 parts of a terpolymer made in accordance with the procedure of Example I, 25 parts of the glycol diamine of Example I, 140 parts of titanium dioxide (RA-50 Tittanox) and 24.7 parts zinc oxide (Number 17 St. Joseph Lead Company).

I claim:

1. A self-sustaining film comprised of an admixture of a terpolymer and a diamino lower alkylether of lower alkylene glycols, which admixture has been heated to a temperature of 50–125° C. said terpolymer being formed by copolymerizing in an inert solvent from 50 to 70 parts styrene, from 10 to 30 parts of a lower alkyl ester of acrylic acid and from 10 to 30 parts of glycidyl methacrylate and said diamino lower alkylether of lower alkylene glycols being present in said admixture in an amount equal to at least 10 percent by weight of said terpolymer.

2. A process for forming a protective film coating which comprises applying a coating to a surface, said coating being an admixture of a diamino lower alkylether of lower alkylene glycols with a terpolymer, said terpolymer being formed by copolymerizing in an inert solvent from 50 to 70 parts styrene, from 10 to 30 parts of a lower alkyl ester of acrylic acid and from 10 to 30 parts of glycidyl methacrylate and said diamino lower alkylether of lower alkylene glycols being in said admixture in an amount equal to at least 10 percent by weight of said terpolymer, heating said coating on said surface to a temperature of from 50–125° C., removing said heated coating from said surface as a self-sustaining film, applying said self-sustaining film to a metal substrate and heating said self-sustaining film to a temperature of at least 150° C. whereupon the film adheres to the metal substrate to form a protective coating.

3. A self-sustaining film formed by heating an admixture of a terpolymer and a diamino lower alkylether of lower alkylene glycols, said terpolymer formed by copolymerizing in inert solvent 60 parts styrene, 20 parts lower alkyl ester of acrylic acid and 20 parts glycidyl methacrylate, said diamino lower alkylether of lower alkylene glycols being present in said admixture in an amount equal to at least 10 percent by weight of said terpolymer, until said admixture becomes a clear self-sustaining film which film when applied to a metal substrate and heated to 150° C. becomes a protective coating bonded to the metal substrate.

4. A process for protecting metal substrates which comprises applying to the metal substrate a self-sustaining film, which film is formed by heating an admixture of a terpolymer with a diamino lower alkylether of lower alkylene glycols, said terpolymer being prepared by copolymerizing in inert solvent 50 to 70 parts styrene, 10 to 30 parts lower alkyl ester of acrylic acid and 10 to 30 parts glycidyl methacrylate, said diamino lower alkylether of lower alkylene glycols being present in said admixture in an amount equal to at least 10 percent by weight of said terpolymer, and then heating said metal substrate and said self-sustaining film to at least 150° C. to bond the film to the metal substrate.

References Cited in the file of this patent

UNITED STATES PATENTS

| | | |
| --- | --- | --- |
| 2,580,901 | Erickson et al. | Jan. 1, 1952 |
| 2,604,463 | Bilton et al. | July 22, 1952 |
| 2,604,464 | Segal et al. | July 22, 1952 |
| 2,723,241 | De Groote et al. | Nov. 8, 1955 |
| 2,849,418 | Fang | Aug. 26, 1958 |
| 2,851,448 | Slocombe et al. | Sept. 9, 1958 |
| 2,921,037 | Andres et al. | Jan. 12, 1960 |
| 2,961,365 | Sroog | Nov. 22, 1960 |
| 2,994,670 | D'Alelio | Aug. 1, 1961 |